Feb. 25, 1964     A. QUINCHE     3,122,274
THERMOPLASTIC-CONTAINER
Filed Dec. 18, 1956     4 Sheets—Sheet 1

Inventor
A. Quinche
By Hancock Downing Seebols
Attys

Feb. 25, 1964  A. QUINCHE  3,122,274
THERMOPLASTIC CONTAINER
Filed Dec. 18, 1956  4 Sheets-Sheet 2
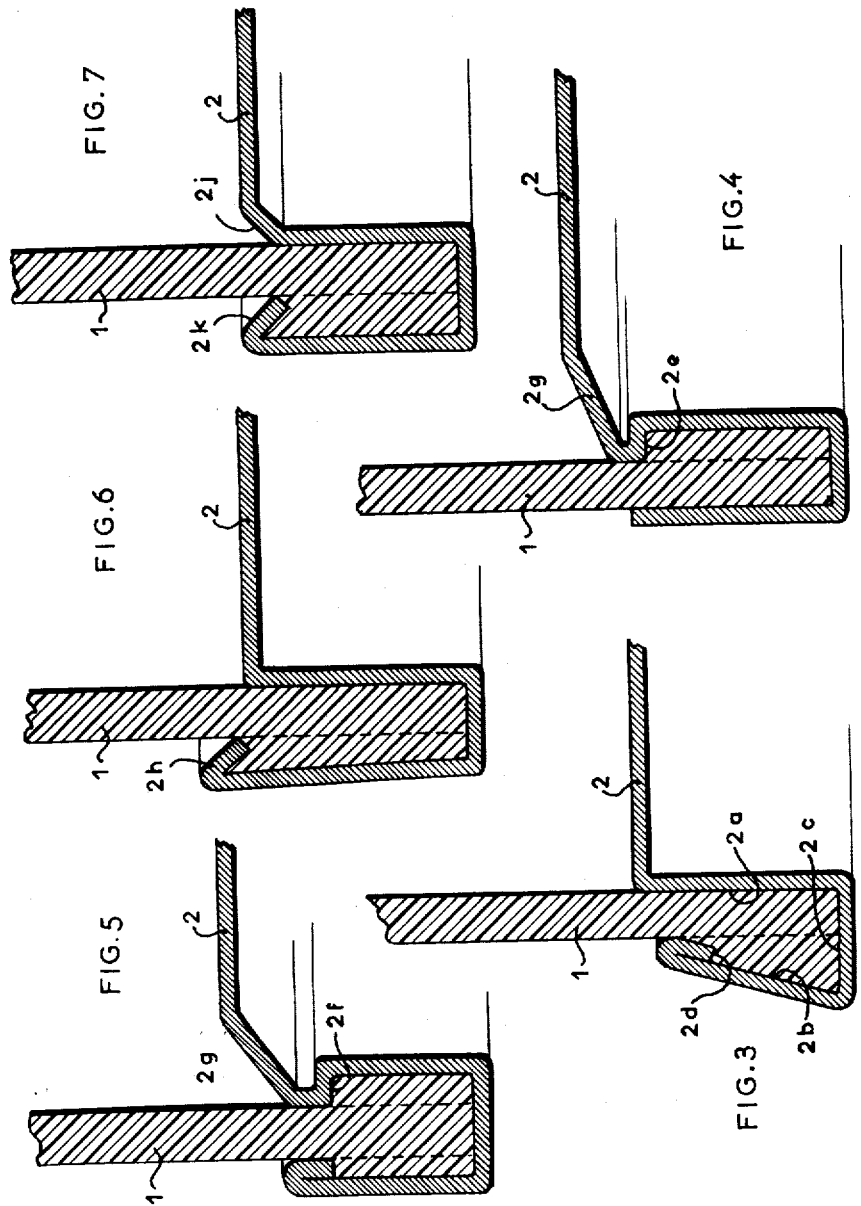
Inventor
A. Quinche
By Glascock Downing Seebold
Attys.

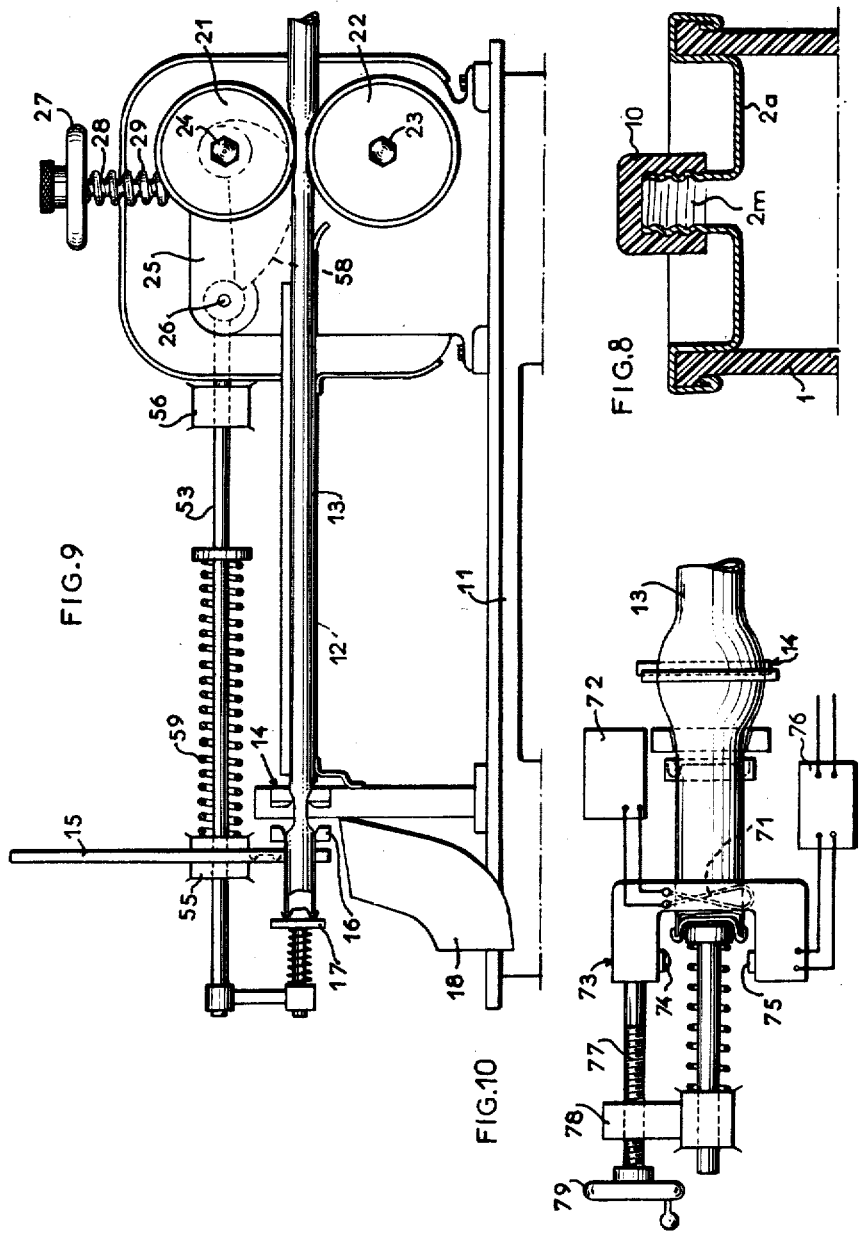

United States Patent Office 3,122,274
Patented Feb. 25, 1964

3,122,274
THERMOPLASTIC CONTAINER
Albert Quinche, St.-Sulpice, Vaud, Switzerland, assignor, by mesne assignments, to American Can Company, New York, N.Y., a corporation of New Jersey
Filed Dec. 18, 1956, Ser. No. 629,082
Claims priority, application Switzerland Dec. 19, 1955
5 Claims. (Cl. 222—107)

The present invention relates to thermoplastic tubular elements, and more particularly, to thermoplastic containers.

One object of the invention is to secure a rigid end piece upon one end of a thermoplastic tubular element, for instance a metal end-piece upon one end of a collapsible or squeeze-to-use tubular container made of thermoplastic material.

For this purpose, the method according to the invention consists in forming in the end-piece to be secured to the tubular element an annular groove having its mouth portion restricted to just accommodate one end of said element introducing said tubular element end into said groove, heating the bottom of said groove to a temperature at least equal to the melting temperature of the thermoplastic material the tubular element is made of, and effecting a relative movement between said end-piece and said tubular element along the axis thereof in the direction which determines a further penetration of said tubular element into said groove, whereby the end portion of the tubular element progressively melts and occupies the whole groove so as to form a radially expanded anchoring annular bead, which once cooled, positively prevents said end-piece and said tubular element from coming apart.

It is a further object of the invention to make said thermoplastic tubular element and said end-piece of two materials having widely different melting points so as to permit heating said end-piece, without taking any special precautions, to a temperature substantially equal to the melting point of said thermoplastic material.

A more specific object of the invention is to combine a tubular element made of polyethylene with a metal end-piece.

Heating the end-piece may be carried out by engaging a heating plate against said end-piece.

When the tubular element is made of a thermoplastic material having hardly any dielectric losses, as is the case with polyethylene, the end-piece, for instance a metallic end-piece, may be heated also by means of high frequency induction electric currents, without the tubular element running the risk of flowing and running away by melting effect. This last method, however is not applicable when it comes to materials such as polyvinyl chloride, which have considerable dielectric losses.

When securing the end-pieces to the tubular elements, in order to avoid a complicated apparatus with a tubular element distributor, means for holding these elements and means for feeding them toward the end-pieces to be secured thereon, and also in order to avoid time losses, it is desirable that the end-piece be secured to the free end of a tube which is continuously delivered by an extrusion machine and severed at lengths equal to the length of the individual tubular elements to be obtained.

If the thermoplastic material the tube is made of, for instance polyvinyl chloride, has a material strength, and/or if the inner and outer dimensions of the tube give it a sufficient rigidity, then the operation of securing the end-pieces to the tube may be carried out directly at the exit from the extrusion machine; if, however, such is not the case, for instance with thin polyethylene, tube feeding means will be inserted between the exit from the extrusion machine and the device for setting the end-pieces. These feeding means may be constituted, for instance, by narrow rollers which clamp the tube over a portion only of its width in order that its edges be not crushed.

The cross-section of the end-piece grooves may have many different suitable configurations. The simplest one has at least one of its side walls inclined in the direction which determines the required restriction of the groove mouth portion toward the bottom thereof.

In a modification of this first shape, a shoulder facing the bottom of the groove may be provided. When the end-piece is made of sheet metal, for instance, this shoulder may be constituted by the peripheral edge of the bottom being folded back inwardly of the groove.

In order to take into account the slight shrinkage of the thermoplastic material while cooling, a perfect seal may be still obtained by providing an annular ridge on the side wall of the groove of shorter radius, i.e. on the side wall adapted to be in engagement with the inner wall of the tube.

Many other configurations could suit the purpose, for instance knurled or serrated surfaces of the groove.

It is another object of the invention to provide at least one of the side walls of the groove with an outward frusto-conical extension so as to facilitate the introduction into said groove of said tubular element end portion.

Another object of the invention is to provide a machine for carrying out the aforesaid method.

A machine according to the invention for securing end-pieces on one end of a thermoplastic tubular element, comprises in combination: means for holding the tubular element; means for bringing an end-piece in front of the end of the tubular element to be sealed; means for urging the end of the tubular element into the bottom of the groove of the end-piece with a predetermined pressure, means for heating said end-piece up to a temperature high enough for causing the portion of the thermoplastic tube in engagement with said end-piece to melt, and means for ejecting said tubular element mounted with its end-piece.

When the operation of setting the end-pieces is carried out at the exit from an extrusion machine which delivers a continuous tube, the machine according to the invention further comprises: means for severing the tube into tubular elements of desired length, and control means for controlling said severing means so that the tubular elements be severed immediately subsequent to an end-piece being secured thereto.

Further objects and advantages of the invention will be apparent to those skilled in the art, from a consideration of the following description of some specific embodiments of the invention, shown by way of examples, in the accompanying drawings, in which.

Figure 2:
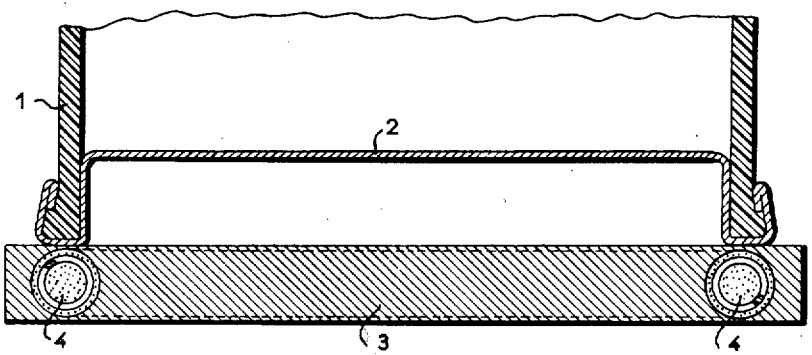
FIG. 2 is a view similar to that of FIG. 1 and shows a second step.
Figure 11:
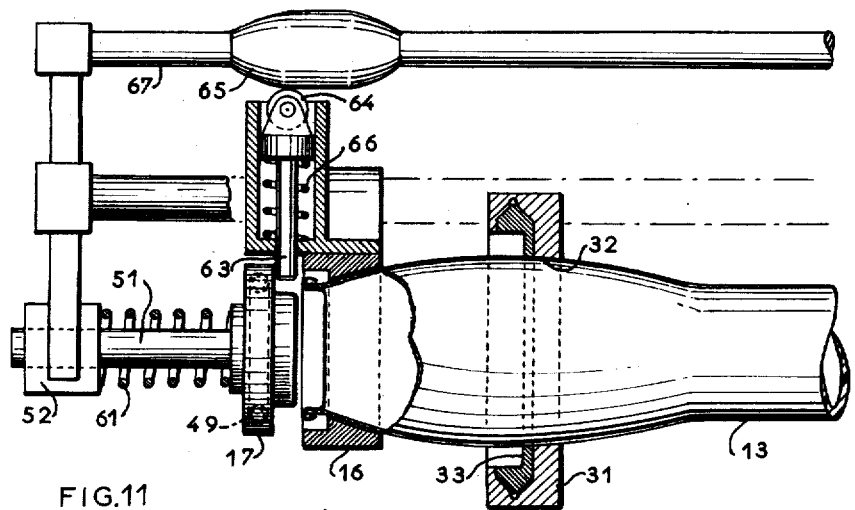
Figure 12:
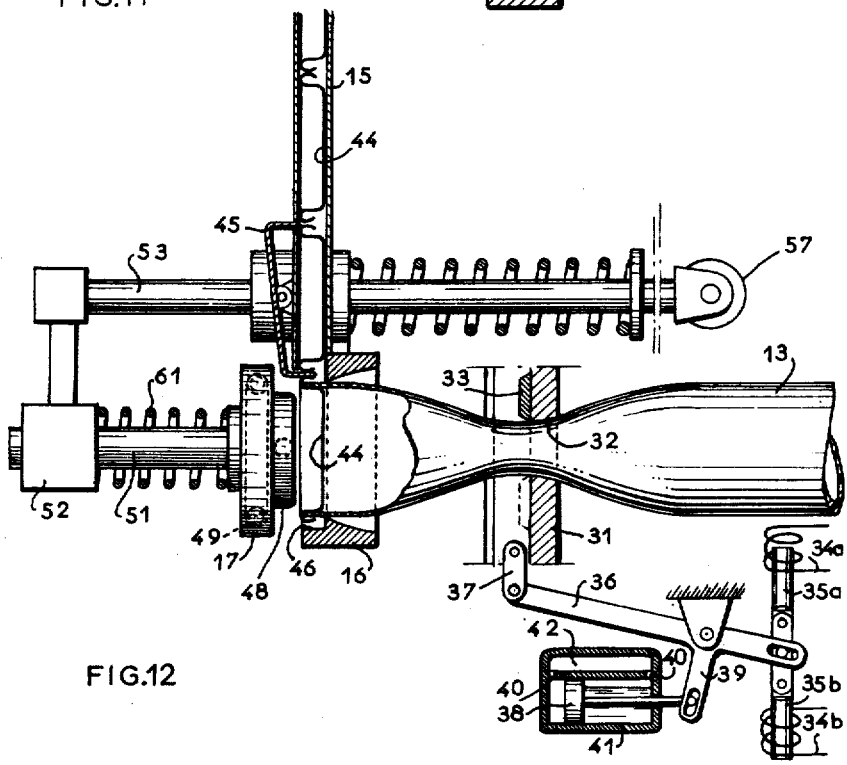

FIG. 3 is an enlarged partly sectional axial view of an embodiment similar to that of FIG. 2, FIGS. 4 and 5 are fragmentary axial sections showing modifications of the groove with an inward conical surface for centering the tube, FIG. 6 is a partly sectional axial view of another modification of the groove with an outward conical surface for centering the tube, FIG. 7 is a partly sectional axial view of another modification of the groove with both inward and outward conical surfaces for centering the tube, FIG. 8 shows an apertured bottom acting as a cover, FIG. 9 is a diagrammatic elevational view of a machine according to the invention for securing end-pieces to the end of tubular elements of thermoplastic material, FIG. 10 is, on a larger scale, a modification of the heating means shown in FIG. 7, FIG. 11 is, on a still larger scale, a plan view, with portions taken away, of the end-piece setting and tube severing devices of the machine of FIG. 9, and FIG. 12 is an elevational view corresponding to FIG. 11.

Figure 1:
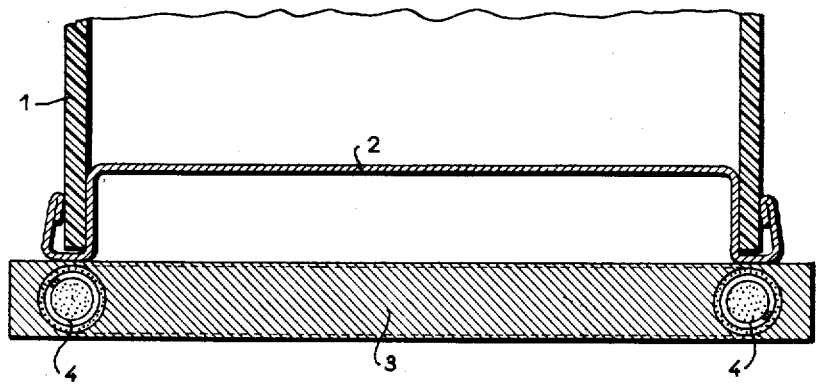
FIG. 1 is an axial section illustrating the method of the invention for securing an end-piece to one end of a thermoplastic tube. The various elements are shown at the moment of the first step of the process.

Referring now more particularly to FIGS. 1 to 3, 1 denotes one end of a tubular member made of thermoplastic material, and 2, an end-piece made from a sheet of metal for instance.

The end-piece 2 is formed with an annular groove having two side faces 2a, 2b, and a bottom wall 2c. The side face 2a is a cylindrical surface and the side face 2b is a frusto-conical surface coaxial with the side face 2a so as to give to the groove an outline progressively widening downwardly. The edge of the side face 2b is folded inwardly to form a shouldering 2d oriented towards the bottom wall 2c. The entrance to the groove, therefore, is narrower than the rest of said groove, and has a width large enough for the tube to be introduced freely into said groove as illustrated in FIG. 1.

A heating plate 3, provided with any sort of suitable conventional heating means 4, such as an electric resistor for instance, is adapted to be applied against the metal end-piece 2, and is so designed as to be able to bring said end-piece, and hence, the portion of thermoplastic tube located in the end-piece groove, up to the melting temperature of said plastic material. The end-piece is preferably made of a material having a melting point materially substantially higher than that of the thermoplastic material of the tubular element. In particular metal end-pieces are preferably used.

It is clear, therefore, that once the end of the tube has been inserted into the end-piece groove (FIG. 1), if the heating plate 3 is applied with a predetermined pressure against the end-piece 2, i.e. in the example illustrated, against the outer face of the bottom of the groove, the end of the tube melts and expands within said groove in order to occupy the whole space available therein, as shown in FIG. 2.

When cool and solidified, the enlarged portion of the plastic tube entrapped within the groove, between the shouldering 2d and the bottom 2c of said groove, it forms an annular bead which positively secures the end-piece 2 to the end of the plastic tube.

Of course any suitable means other than the heating plate 3 may be used for melting the end portion of the tube, e.g. high frequency currents.

Also, many other shapes may be given to the cross-section of the groove in the end-pieces, provided same has a width substantially equal to the thickness of the tube to be sealed, and an enlarged portion facing the bottom of said groove.

It will be noted that, taking into consideration the slight shrinkage of the plastic material while cooling, a better seal is obtained with grooves having a cross-section formed with a shoulder or ridge on the side wall of smaller radius which is in engagement with the inner wall of the tube, such as the shouldering 2e and 2f shown in the illustrations of FIGS. 4 and 5 rather than on the side wall of larger radius.

In order to facilitate the introduction of the end portion of the tubular body into the annular groove of the rigid end-piece the latter is preferably provided with a guiding frusto-conical surface disposed in front of the entrance of the said annular groove.

The said guiding surface may constitute an extension of the side wall and smaller radius of the annular groove, as shown as 2g in FIGS. 4 and 5 or an extension of the side wall of greater radius of the said groove, as shown as 2h in FIG. 6. Finally both kinds of guiding surfaces may be used together as shown at 2j and 2k in FIG. 7.

FIG. 8 shows a modification in which an end-piece 2a, secured to the tubular element 1 in the above-described manner, offers an axial pouring neck 2m provided with a screw plug 19; one end of the tubular element 1 may be provided with an end-piece of any one of the types shown in FIGS. 1 to 7 while its other end is provided with a central neck, of the type shown in FIG. 8, the whole assembly then forming for example a squeeze-to-use container, the content of which may be extracted through the neck 2m.

According to another alternative, the container may be provided with an end-piece of any one of the types shown in FIGS. 1 to 7, at one end, while its other end may be provided with any other desired type of end or cover. The latter may be, for example, made of plastic material, e.g., welded on the tubular container or, again, be constituted by a rigid piece provided with apertures if desired.

Referring now to FIG. 9, description will be given of a machine which makes it possible to carry out the above described method for anchoring a rigid end-piece on one end of a thermoplastic tubular member. This machine is particularly designed for securing end-pieces to successively severed portions of a tube continuously delivered by an extrusion machine.

Near the exit from an extrusion machine is arranged an end-piece securing machine according to the invention, having a frame 11, a through-shaped guiding and supporting member 12 carried by said frame for receiving a thermoplastic tube 13 delivered by the extrusion machine, a severing device generally indicated at 14, an end-piece distributor 15, a shaping cone 16, a device for holding and controlling a heating plate 17, and a funnel 18 for collecting the finished articles.

If need be, i.e. if the tube is thin and flexible, feed rollers 21, 22 may also be provided for feeding the tube into the machine. The shaft 23 of the lower roller 22 is stationary whereas the shaft 24 of the upper roller 21 is mounted at the free end of a swinging lever 25 pivoted on a spindle 26 mounted in the machine frame. The width of the rollers is shorter than that of the tube 13 pressed flat between the rollers in order that the tube be not damaged by crushing effect upon its edges. The pressure exerted by the rollers upon the moving tube 13 may be adjusted by means of a handwheel 27 mounted on a screw-threaded spindle 28 and acting upon a compression spring 29.

The severing device is shown on a larger scale in FIGS. 11 and 12. It comprises a stationary support 31 acting as a counter-blade having an elongated opening 32 through which the tube 13 is passed, and a vertically movable blade 33 having two inclined opposite cutting edges visible in FIG. 12. By virtue of this particular structure, the movable blade 33 severs the tube alternately downwardly and upwardly, in order not to engage twice the end face of the tube which, it should be kept in mind, is permanently and continuously progressing through the machine.

The movable blade 33 is actuated by an electromagnetic device having two energizing coils 34a and 34b which cooperate with two cores 35a, 35b respectively, both operatively connected to the blade 33 through a rocking lever 36 and a connecting rod 37. A damping device comprising a piston 38 operatively connected to an additional arm 39 of the rocking lever 36 and reciprocable in a cylinder 41 only partially filled with oil, the remaining space being occupied by a gas, such as air. A chamber 42 communicates with both cylinder ends through two calibrated orifices 40.

A control and timing device (not shown) provides for successively energizing the coils 34a, 34b in order to lower and raise the movable cutter blade 33. In the first portion of its stroke, the piston 38 has little effort to develop for forcing the air into the chamber 42, whereas a suitable damping effect is provided by the resistance of the oil forced by the piston into the chamber 42 at the end of the strokes of the piston and the magnetic cores.

The shaping cone 16 has for its object to bring the cross-section of the tube 13, which was flattened when passing through the severing device back into circular shape ready for receiving a circular end-piece.

The end-piece distributor 15 is a vertical tubular member in which a stock of end-pieces 44 are vertically stacked on one another. It has a rocking distributing finger 45 adapted to release only one piece at a time according to any suitable technique well-known in the art. A horizontal shoulder 46 of the shaping cone 16 provides a resting surface for an end-piece to be inserted over the end of the tube.

The heating palte 17 has a centering portion 48 mating with the outer face of the end-pieces, and is provided with suitable heating means, such as an electric resistor 49. It is carried on the outer end of a rod 51 slidably mounted in alignment with the tube axis in a block 52, itself carried at one end of a long rod 53 mounted for longitudinal sliding movement parallel with the direction of progression of the tube 13 in two bosses 55, 56 (FIG. 9) of the machine frame. The other end of the rod 53 is fitted with a cam follower 57 which is urged by a spring 59 against a cam 58 rigid with the upper-feed roller shaft 24. Furthermore the heating plate 17 is urged toward the tube end by a spring 61. The profile of the cam 58 is so designed as to cause the rod to be longitudinally shifted exactly at the same speed as the speed of progression of the plastic tube delivered by the extrusion machine.

In order to allow the end-pieces to drop and come to rest upon the shoulder 46, provision is made for a locking finger 63 adapted to retain the heating plate 17 against the action of the spring 61 as long as the corresponding end-piece is not yet lowered to rest position. The locking finger 63 is fitted with a cam follower 64 urged by a spring 66 against an olive shaped cam 65 rigid with a rod 67 also connected to the block 52.

The operation of the machine which has just been described is as follows:

The thermoplastic tube 13 delivered by the extruding machine is seized by the feed rollers 21, 22 and progresses on the guiding support 12, then through the severing device 14 and the shaping ring 16. An end-piece 44 rests on the shoulder 46, the end of the tube enters the annular groove of said end-piece and pushes it over the centering portion 48 and against the heating plate 17, which travels along with the end of the tube capped with the end-piece. The spring 61 provides for the required pressure of the heating plate against the end-piece which, now, heats up. The end of the tube melts and completely fills the groove, forming a perfect seal. It then cools, under the action of cooling means such as an air jet, if need be, and is solidified. The severing means is actuated, and the tubular element fitted with an end-piece now drops into the funnel 18. The heating plate 17 is returned to its original position by the spring 59 and a new end-piece is dropped onto the shoulder 46.

When the plastic material the tube is made of has no or little dielectric losses, as is the case with polyethylene for instance, then it is possible to resort to high frequency electric currents for heating the end-pieces without the end of the tube running the risk of melting and flowing away in the course of the heating operation. For this purpose, use may be made of a device similar to that shown in FIG. 10 in which 71 is a solenoid arranged coaxially with the path of travel of the tube and having an inner diameter larger than the outer diameter of the end-pieces. The solenoid 71 is connected to a suitable source 72 of high frequency current. The end-pieces are made of a material having high dielectric losses, but the melting point of which is much higher than that of the tube; preferably they are made of metal.

It is clear that, while an end-piece placed on the travelling end of the plastic tube moves through the solenoid it is heated by the action of the high frequency currents and causes the end of the tube to melt and fill the groove as already described hereinabove.

Also by way of modification, FIG. 10 shows an electronic device for controlling the severing mechanism. This electronic device is carried by a support 73 and has a source of light 74 and a photo cell 75 arranged on either side of the path of travel of the tube. It is connected to the severing mechanism coils 34a, 34b through an amplifier 76. The heating solenoid 71 may be carried by the same support as the electronic device. The support 73 is adjustable along the tube axis, as by means of a screw-threaded spindle engaged through a boss 78 of the machine frame and equipped with an adjusting handwheel 79.

It will be understood that, when the end of the plastic tube fitted with an end-piece intersects the beam of light emitted by the electronic device, the photo-cell 75 is activated and causes the severing mechanism to cut the tubular portion to length. This length may be adjusted at will by means of the handwheel 79.

As many changes could be made in the above construction, and many widely different embodiments of this invention could be made without departing from the scope of the claims, it is intended that all matter contained in the above description or shown in the accompanying drawings shall be interpreted as illustrative and not in a limiting sense.

What is claimed is:

1. A container comprising a flexible resinous thermoplastic tubular container body and at least one end closure more rigid than said body secured to one end thereof, said end closure having a generally U-shaped peripheral groove extending substantially axially of the body and converging toward the opposite end of said body to provide a restricted peripheral mouth, said mouth having a transverse dimension substantially corresponding to the thickness of the body, and being more narrow than the bottom of said groove, said body having an enlarged solid bead homogeneous with the thermoplastic body at said one end thereof and permanently disposed in and entirely confined by said groove, the said bead diverging outwardly to the extremity of said one end of said body and being formed with a relatively flat end wall by heat molding an end portion of said thermoplastic body in the groove to intimate conformity with the interior shape of the groove without deformation of the groove configuration, whereby the body is permanently anchored to said end closure.

2. A squeeze-to-use container having a body wall of a flexible resinous plastic material, the body wall being self-sustaining and except for its extreme ends being of substantially uniform thickness throughout its length and being squeezable to eject the contents through an opening, and an end closure more rigid than said body permanently secured to one end of said body wall, said end closure being formed with an annular generally U-shaped groove converging toward the opposite end of said body and having a depth dimension extending substantially parallel with the axis of said body wall, said groove having a restricted mouth whose transverse dimension is substantially equal to said uniform wall thickness, said body wall having an enlarged marginal portion at said one end thereof having a flat bottom wall located in the bottom of said groove and said enlarged portion being of greater transverse dimension than said uniform wall thickness, said enlarged marginal portion of said body wall being entirely confined by and within the groove and molded in place without deformation of the groove configuration to intimately conform said enlarged marginal portion to the interior dimensions of said groove and thus radially expanded in laterally uncompressed condition within said enlarged portion of said groove to a thickness greater than said uniform wall thickness so as to form an annular marginal anchoring bead having a relatively flat end wall.

3. A container comprising a flexible resinous thermoplastic tubular body of characteristic uniform thickness throughout its major extent, and an end-piece more rigid than said body secured to one end thereof and being formed with an annular generally U-shaped groove, axially opening towards the opposite end of said body and having a restricted mouth whose transverse dimension corresponds substantially to the said characteristic uniform body thickness, said groove being defined by a pair of side walls and a connecting flat bottom wall, the bottom wall of said groove having a transverse dimension greater than the transverse dimension of said mouth, and one of said side walls having an inturned flange formed thereon, one end portion of said tubular body being permanently secured in and entirely confined by said groove in abutment with the flat bottom wall thereof and constituting a solid bead homogeneous with said body at said one end thereof and enlarged with respect to said uniform wall thickness disposed in and fitting said groove whereby said body is permanently anchored to said end-piece and is locked in said groove by said inturned flange.

4. A container according to claim 3, wherein at least the side wall of said annular groove having the inturned flange thereon is inclined in the direction which provides for said restricted mouth.

5. A container according to claim 3, wherein at least the other of said side walls of said annular groove is formed with an annular shoulder facing the bottom of the groove.

References Cited in the file of this patent

UNITED STATES PATENTS

| | | |
|---|---|---|
| 1,108,376 | Lannoye | Aug. 25, 1914 |
| 1,174,648 | Wright | Mar. 7, 1916 |
| 1,345,021 | Oglesby | June 29, 1920 |
| 1,648,026 | Murray | Nov. 8, 1927 |
| 2,041,518 | Salz | May 19, 1936 |
| 2,052,616 | Gardes | Sept. 1, 1936 |
| 2,059,867 | Hinds | Nov. 3, 1936 |
| 2,082,701 | Kueffner | June 1, 1937 |
| 2,170,436 | Vogel | Aug. 22, 1939 |
| 2,305,705 | Hendrickson | Dec. 22, 1942 |
| 2,363,352 | O'Brien | Nov. 21, 1944 |
| 2,389,534 | O'Brien | Nov. 20, 1945 |
| 2,476,446 | Lindell | July 19, 1949 |
| 2,534,948 | Brummer et al. | Dec. 19, 1950 |
| 2,686,337 | Kaufman | Aug. 17, 1954 |
| 2,732,978 | Oakland | Jan. 31, 1956 |
| 2,753,088 | Prahl | July 3, 1956 |
| 2,782,459 | Moncrieff | Feb. 26, 1957 |
| 2,799,435 | Abplanalp | July 16, 1957 |

FOREIGN PATENTS

| | | |
|---|---|---|
| 718,881 | France | Nov. 13, 1931 |